(12) United States Patent
Bergmann

(10) Patent No.: US 9,056,421 B2
(45) Date of Patent: Jun. 16, 2015

(54) METHODS AND SYSTEMS FOR DIMENSIONAL INSPECTION OF COMPENSATED HARDWARE

(71) Applicant: Spirit AeroSystems, Inc., Wichita, KS (US)

(72) Inventor: Blaise Francis Bergmann, Clearwater, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 202 days.

(21) Appl. No.: 13/679,472

(22) Filed: Nov. 16, 2012

(65) Prior Publication Data

US 2013/0129184 A1    May 23, 2013

Related U.S. Application Data

(60) Provisional application No. 61/560,990, filed on Nov. 17, 2011.

(51) Int. Cl.
| | |
|---|---|
| *G06K 9/00* | (2006.01) |
| *B29C 67/00* | (2006.01) |
| *G06K 9/78* | (2006.01) |
| *B29C 70/44* | (2006.01) |
| *B29C 33/38* | (2006.01) |

(52) U.S. Cl.
CPC . *B29C 67/00* (2013.01); *G06K 9/78* (2013.01); *B29C 70/44* (2013.01); *B29C 33/3835* (2013.01); *B29C 33/3842* (2013.01)

(58) Field of Classification Search
CPC ............... G06T 7/0004; G06T 7/001; G06T 2207/30148; G06T 2207/30164; G06T 7/0006; B29C 45/76; B29C 45/77
USPC ........ 382/141, 144–152; 264/40.1, 40.3–40.7
See application file for complete search history.

(56) References Cited

U.S. PATENT DOCUMENTS

2008/0021587 A1*  1/2008  Wu et al. ...................... 700/121

* cited by examiner

*Primary Examiner* — Ruiping Li
(74) *Attorney, Agent, or Firm* — Hovey Williams LLP

(57) ABSTRACT

A manufacturing method is adapted for materials that are susceptible to deformation during the manufacturing process, such as composite parts that change shape during curing. The method includes modifying a part design to compensate for changes in the shape of the part that occur during a curing phase of the manufacturing process. A manufacturing mold is created according to the modified part design, then a part is formed in the mold and cured in the mold. While the part is still in the mold after the curing phase, the part is finished according to the modified part design wherein excess material is removed and apertures are created. While the part is still in the mold after the finishing phase, the finished part is inspected using automated inspection equipment to confirm that the finished part conforms to the modified part design.

19 Claims, 2 Drawing Sheets

METHODS AND SYSTEMS FOR DIMENSIONAL INSPECTION OF COMPENSATED HARDWARE

RELATED APPLICATIONS

This non-provisional patent application claims priority benefit with regard to all common subject matter of earlier-filed U.S. Provisional Patent Application No. 61/560,990, filed Nov. 17, 2011 and entitled METHODS AND SYSTEMS FOR DIMENSIONAL INSPECTION OF COMPENSATED HARDWARE. The earlier-filed provisional application is hereby incorporated by reference in its entirety into the present application.

BACKGROUND

1. Field

Embodiments of the present invention relate to manufacturing methods and systems. More particularly, embodiments of the present invention relate to manufacturing methods and systems suited for materials that are susceptible to deformation during the manufacturing process.

2. Related Art

Parts made from composite materials, such as aircraft parts, may be manufactured in a process that involves forming the parts on or in a mold that bears the shape of the part being manufactured. In such processes, ingredients of the composite parts such as reinforcing fiber and resin are applied to the mold, cured, and then removed from the mold for additional processing and inspection. Depending on the material used and the curing process, the part may not retain its shape after being removed from the mold on which it is cured due to structural changes that occur in the part during the curing process. To address this problem, the shape of the mold may be modified to compensate for the changes in the size and shape of the part such that when the part is removed from the mold it assumes the size and shape of the original part design.

When the part is removed from the manufacturing mold it is fitted onto a trim tool to be finished and then inspected to ensure that it conforms to the size and shape of the original part design. Unfortunately, fitting the part onto the trim tool is another step in the manufacturing process, requiring additional time and resources and introducing the possibility of human or machine error. Furthermore, if the part being manufactured is large or complex, accurately placing the part on the trim tool may be particularly difficult and require tedious manual effort.

SUMMARY

Embodiments of the present invention solve the above-described problems by providing a system and method of part manufacturing that compensate for changes in the shape of a part that occur during the manufacturing process.

A method in accordance with an embodiment of the invention comprises forming a part in a manufacturing mold that reflects a modified part design. The modified part design compensates for changes in the shape of the part that occur after the part is formed and removed from the mold, such that the formed part conforms to a target part design after it is removed from the mold and is in a relaxed position. While the part is in the mold after being formed therein, it is finished according to the modified part design and is inspected using automated inspection equipment to confirm that the finished part conforms to the modified part design. In relate embodiments, a part is formed on the manufacturing mold, as described above, following which the part is either finished according to the modified part design or inspected to confirm that the finished part conforms to the modified part design.

A method of manufacturing a composite part in accordance with another embodiment of the invention comprises creating a design for a composite part that includes aperture definitions, surface contours and a periphery definition and modifying the design to compensate for changes in the shape of the part that occur during the manufacturing process. The method further comprises creating a manufacturing mold such that the shape of the mold reflects the modified part design and forming the composite part on the mold by placing a composite ingredient mixture in the mold, the composite ingredient mixture including carbon fibers and a resin.

The part is cured in the mold by heating the part to a temperature of at least 200° C. and allowing the part to cool to room temperature. While the composite part remains in the mold after the curing, excess material is removed from the part according to the modified part design, one or more edges are shaped with a router according to the modified part design, and apertures are created in the part according to the modified part design. The finished part is inspected using automated inspection equipment to confirm that the apertures, surface contours, and a periphery of the part conform to the modified part design, and the composite part is removed from the manufacturing tool.

A system in accordance with yet another embodiment of the invention comprises an image capture device and a controller. The controller is configured to receive an image of a manufactured part from the image capture device and compare the image to a modified part design, wherein the modified part design compensates for changes in the shape of the part that occur after the part is formed and removed from a mold, such that the formed part conforms to a target part design after it is removed from the mold and is in a relaxed position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Figure 1:
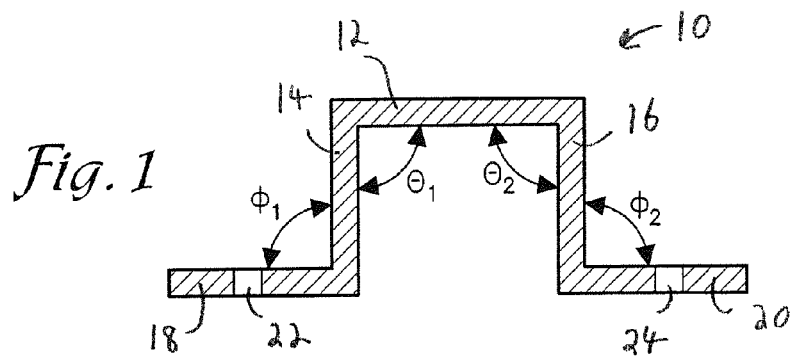
FIG. 1 is a cross-sectional view of an exemplary design of a part to be manufactured with a system and method in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Referring now to the drawings, wherein like reference numerals designate identical or corresponding parts throughout the several views, manufacturing systems and processes in accordance with embodiments of the invention are illustrated. The manufacturing processes are adapted for the manufacture of parts that are susceptible to deformation during the manufacturing process. An exemplary design 10 of a part manufactured in accordance with principles of the present invention is illustrated in FIG. 1. The part design 10, also referred to herein as the "original" or "target" part design, may be developed using conventional methods, such as computer-aided drafting, and represents the desired size and shape of a finished part.

The part may have virtually any intended use including, for example, use in an aircraft or other vehicle, and may be constructed of any of various materials, such as metal or plastic, or may be a composite part. In the exemplary process described and illustrated herein, the part is constructed of a composite material comprising, among other things, carbon fiber and thermosetting resin, as explained below in greater detail.

FIG. 1 presents a cross-sectional view of the part design 10 and, for the purpose of simplicity, omits various design details that are not germane to the present discussion. The illustrated part design 10 includes a plurality of segments including a top segment 12, two side segments 14, 16 corresponding to opposing sides of the top segment 12, and two outer segments 18, 20 each extending outwardly from a lower margin of one of the side segments 14, 16. The side segments 14, 16 each form an angle $\theta_1$, $\theta_2$ of approximately ninety degrees with the top segment 12, the first outer segment 18 forms an angle $\varnothing_1$ of approximately ninety degrees with the first side segment 14, and the second outer segment 20 forms an angle $\varnothing_2$ of approximately ninety degrees with the second side segment 16.

The part design 10 further includes a first aperture 22 in the first outer segment 18 and a second aperture 24 in the second outer segment 20. Each of the first 22 and second 24 apertures extends through the respective outer segments 18, 20 and presents a round cross-section defining a central axis that is approximately normal to a plane defined by the respective outer segment corresponding to the aperture.

The part design 10 illustrated in FIG. 1 includes a relatively small number of segments and is otherwise relatively simple for the purpose of illustrating principles of the present invention. It will be appreciated that principles of the present invention are useful with various design configurations, including complex part designs defined by many segments of various shapes and sizes and apertures of various shapes and sizes.

When the original part design 10 is developed, it is modified to compensate for changes that occur in the shape of the part during the manufacturing process. The part may become deformed in the manufacturing process for various reasons, but a common cause of deformation relates to changes in the volume of resin that occur in the manufacturing process. Composite part materials commonly include, among other things, a combination of reinforcing fibers and resin. The resin is hardened in a curing process that may involve applying heat and pressure to the material. During the curing process the resin may contract, and may contract a disproportionately greater amount in a direction that is transvers to the grain of the fibers than in a direction that corresponds to the grain of the fibers. This may result, for example, in the thickness of a part decreasing a disproportionately larger amount than the length of the part during the curing process.

This uneven pattern of contraction across the thickness versus the length of the part results in a phenomenon known as "spring-in," which is the tendency of adjacent part segments to draw inward toward one another thereby reducing the angle of separation between the segments. Thus, when the part is removed from the mold after the curing phase the segments "spring in" toward one another and the resulting part does not conform to the shape of the original design. In the part design 10 illustrated in FIG. 1, spring-in causes each of the angles $\theta_1$, $\theta_2$, $\varnothing_1$ and $\varnothing_2$ to decrease.

Figure 2:
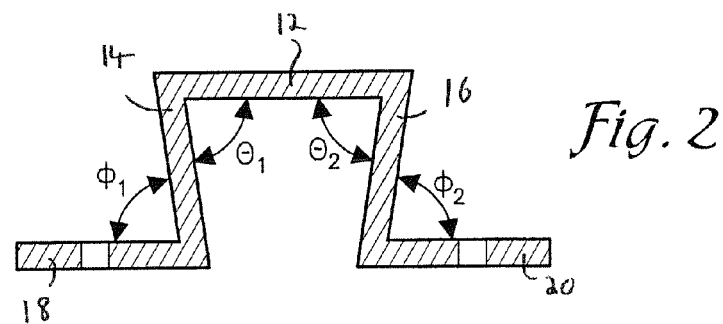
FIG. 2 is a cross-sectional view of a part constructed according to the design of FIG. 1 in a process that does not compensate for changes in the shape of the part that occur during the manufacturing process.

FIG. 2 illustrates the final shape of a part susceptible to spring-in that is manufactured according to the design 10 of FIG. 1 in a manufacturing process that fails to compensate for spring-in. In the part illustrated in FIG. 2, the segments forming each corner have drawn inward toward one another causing each of the angles $\theta_1$, $\theta_2$, $\varnothing_1$ and $\varnothing_2$ to decrease and causing the apertures to be misplaced relative to the top segment 12. Although the part illustrated in FIG. 2 may be manufactured in a mold that reflects the original part design 10 of FIG. 1, once the part is removed from the mold the part assumes the shape illustrated in FIG. 2. The part of FIG. 2 would fail inspection and would have to be discarded.

Figure 3:
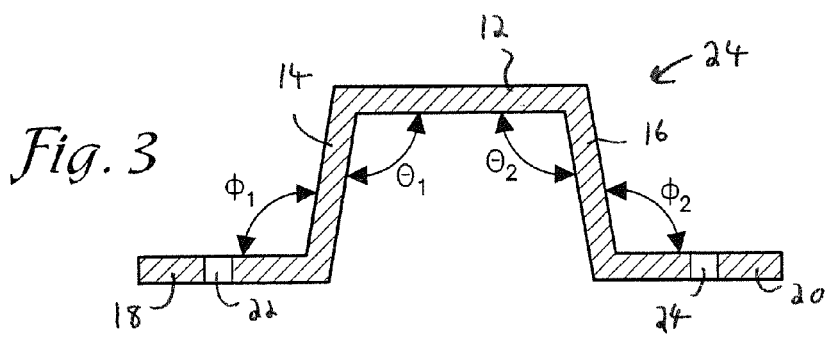
FIG. 3 is a cross-sectional view of a part design modified to compensate for changes in the shape of the part that occur during the manufacturing process.

An exemplary modified part design 24 illustrated in FIG. 3 compensates for changes in the shape of the part that occur during the manufacturing process. The modified part design 24 is similar to the original design 10, but each of the angles $\theta_1$, $\theta_2$, $\varnothing_1$ and $\varnothing_2$ is increased. The increase of each angle corresponds to the anticipated spring-in of each corner, such that when a part is manufactured according to the modified part design 24 of FIG. 3 the part "springs-in" to the form of the original design 10 when removed from the manufacturing mold.

The modified part design 24 may be developed using either an automated method or a manual method. An exemplary automated method involves using computer software, such as NASTRAN software, to perform finite element analysis on the original part design 10 to generate the modified design 24. Alternatively, a user may manually develop the modified design 24 using, for example, a process of trial and error wherein the user estimates the amount of modification needed to compensate for changes in the shape of the part, creates a mold according to the estimate, manufactures a part on the estimated mold design, compares the shape of the finished part with the target design, and adjusts the mold design to resolve differences between the actual shape of the part and the target design. This process may be repeated until the actual size and shape of the part conforms to the target design.

Figure 4:
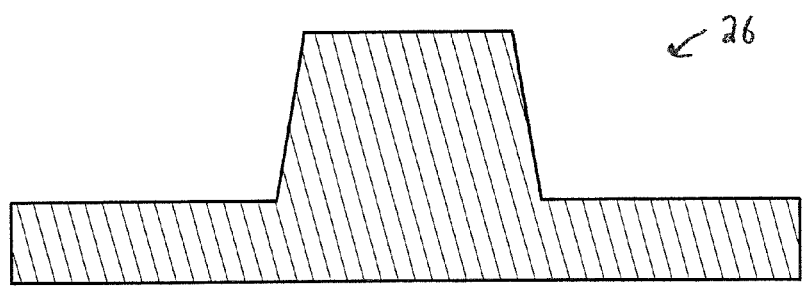
FIG. 4 is a cross-sectional view of a manufacturing mold presenting a shape that corresponds to the modified part design of FIG. 3.

Once the modified part design 24 is developed, a manufacturing mold is created according to the modified part design 24. FIG. 4 illustrates a mold 26 designed to manufacture parts according to the modified part design 24. It will be appreciated by those skilled in the art that the mold 26 may include additional elements, such as additional walls, additional surfaces, or an enclosure. Such additional elements are omitted here for simplicity. The mold 26 may present an open or closed configuration and present any of various sizes and shapes according to the design of the part to be manufactured and may be an open mold or a closed mold.

A part is then formed in the mold 26. If the part is formed of a composite material, forming the part 28 may involve a series of steps, including placing a combination of various composite material ingredients in the mold 26 and hardening the combined ingredients. By way of example, the composite material may be a combination of a reinforcing fiber and a resin. The reinforcing fiber provides strength, dimensional stability and/or heat resistance to the part, and may include carbon fiber, graphite fiber, glass fiber, aramid fiber, or a combination thereof. The resin may be a thermosetting polymer such as unsaturated polyester, vinylester, an epoxy or a polyurethane.

Those skilled in the art will recognize that the composite material may include additional ingredients, such as a curing agent, a solvent or both. A curing agent, also known as a "hardener," controls the reaction rate of the resin by acting as a catalyst and determines the performance characteristics of the finished part by helping cure the resin into a hard plastic. The solvent may be introduced into the process as part of the resin, as part of the curing agent or as a separate ingredient. Other ingredients that may be used include, without limitation, accelerators, reactive diluents and pigments. Principles of the present invention are useful with various manufacturing processes involving various types of materials. Thus, the particular forming and hardening process and the materials used may differ from one implementation of the invention to another without departing from the spirit or scope of the invention.

Figure 5:
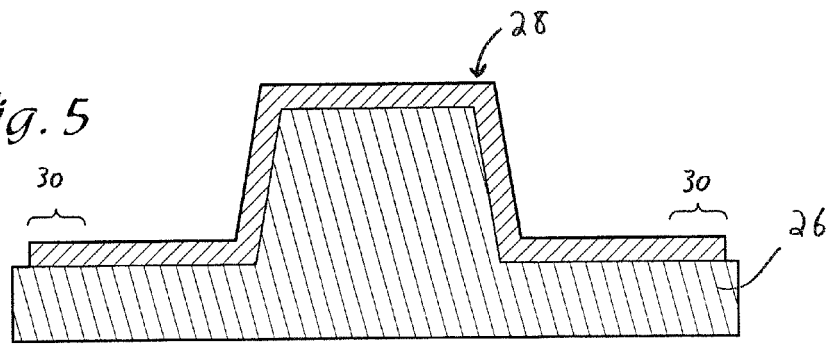
FIG. 5 is a cross-sectional view of the mold of FIG. 4 with an unfinished part formed on the mold.

After the material is placed in the mold it is hardened to form an unfinished part 28. The material may be hardened through a curing process involving applying heat and pressure to the material. The material is hardened in the mold 26 such that it assumes the shape of the mold 26 as it hardens. After the hardening process the part 28 is allowed to cool, if necessary. By way of example, the part may be heated to a temperature of 150° C., 200° C. or 250° C. and may be subject to a pressure of between 20 and 200 psi. Hardening the composite material may involve placing the material in an autoclave or similar device that simultaneously applies heat and pressure to the composite material. An exemplary unfinished part 28 is illustrated in FIG. 5, wherein the part includes manufacturing excess 30, does not include apertures, and has not been trimmed.

Figure 6:
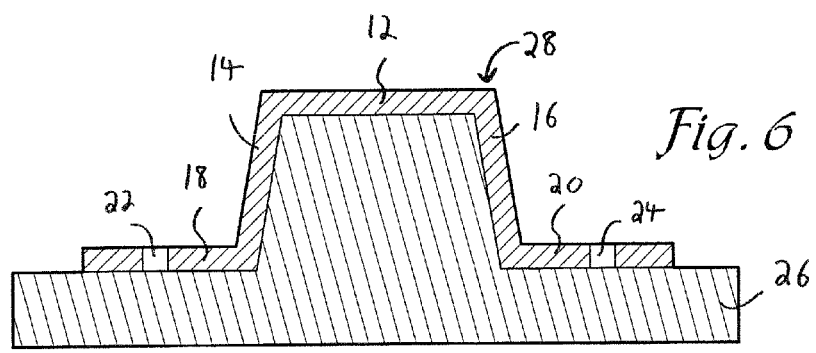
FIG. 6 is a cross-sectional view of the mold and part of FIG. 6, the part having been finished while on the mold.

When the hardening process is complete, the part 28 may be finished while it remains on the mold 26. Finishing the part 28 involves removing the manufacturing excess 30 and completing part details, such as apertures and edges. An exemplary finished part 28 is illustrated in FIG. 6. In the illustrated embodiment, finishing the part 28 involves removing manufacturing excess 30 from each of the outer segments 18, 20 and creating the apertures 22, 24 in each of the outer segments 18, 20. The apertures 22, 24 may be created by, for example, drilling holes in the outer segments 18, 20. Additional finishing may be performed, such as shaping one or more edges of the part 28 with a router. A portion of the mold 26 may need to be moved or removed to provide full access to the part 28 during the finishing phase. However, the part 28 remains on the mold 26 during the finishing process.

Figure 8:
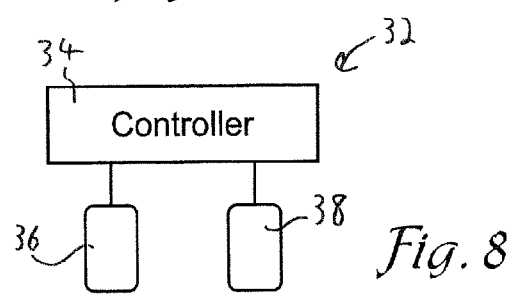
FIG. 8 is a block diagram of an inspection system constructed in accordance with embodiments of the invention.

When the part 28 is finished it may be inspected while it is still in the mold 26 to ensure that it conforms to the modified part design 24. The inspection may be performed using an automated system, such as the automated system 32 illustrated in FIG. 8 that includes a controller 34 and one or more image capture devices 36, 38. The system 32 is operable to capture images of the part 28 from one or more angles and process the captured images to compare various visible characteristics of the part 28 with the modified part design 24. The visible characteristics may include the shape and size of the periphery of the part 28, one or more contours of the part, and the location, size and shape of the apertures 22, 24. The part 28 may be inspected manually in lieu of or in addition to the automated inspection described above. Manual inspection may involve, for example, placing a template configured according to the modified part design over or adjacent the part 28 to compare visible aspects of the part 28 to corresponding elements of the template.

Because the inspection is performed while the part 28 remains on the mold 26 after the manufacturing process, the inspection system 32 is configured to compare the visible characteristics of the part to the modified part design 24 rather than the original part design 10. Finishing and inspecting the part 28 in the manufacturing mold 26 is advantageous in that the part 28 does not need to be fitted onto another manufacturing tool for the finishing or inspection, thus rendering the overall manufacturing process more efficient and less susceptible to errors, such as improper placement of the part 28 on a second manufacturing tool which may result in a good part failing inspection.

Figure 7:
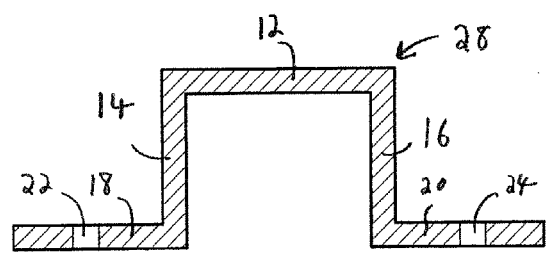
FIG. 7 is a cross-sectional view of the part of FIG. 6, shown removed from the mold in a relaxed position wherein the shape of the part conforms to an original part design.

When the finishing and inspection are complete, the part 28 is removed from the mold 26 and is ready to use. As illustrated in FIG. 7, the shape of the part 28 changes when it is removed from the mold 26. In the illustrated embodiment, the shape of the part 28 changes in response to spring-in, as explained above. Each of the side segments 14, 16 "springs in" toward the other side segment such that each of the segments generally forms a right angle with the top segment in conformance with the original design. Similarly, each of the outer segments 18, 20 "springs in" reducing the angle of separation between it and the side segment to which it is attached such that each of the outer segments 18, 20 generally forms a right angle with the side segment 14, 16 to which it is attached in conformance with the original design 10. Because the part 28 was previously finished and inspected, once it is removed from the manufacturing mold 26 it is ready for use.

The manufacturing process described above includes the steps of finishing and inspecting the part 28 while the part 28 is in the mold. In various embodiments of the invention, however, one or both of the finishing and inspecting steps may be omitted. The part 28 may be completely formed in a closed mold, for example, obviating the need to trim excess material, create apertures, or otherwise finish the part. Additionally or alternatively, inspection of the part 28 may not be required due to the nature or intended use of the part 28, such as where the part is intended for use in a non-regulated industry and a repeatable manufacturing process is established.

Although the invention has been described with reference to the exemplary embodiments illustrated in the attached drawings, it is noted that equivalents may be employed and substitutions made herein without departing from the scope of the invention as recited in the claims. For example, while the manufacturing process described and illustrated above involves the use of thermosetting resin, it will be appreciated that other types of resin may be used, including thermoplastic resins such as polypropylene and polyethylene. Furthermore, the process described herein is not limited to composite materials. Other, non-composite materials that are susceptible to deformation during the manufacturing process may also be used without departing from the scope of the invention.

Having thus described various embodiments of the invention, what is claimed as new and desired to be protected by Letters Patent includes the following:

1. A method for forming parts comprising:
    forming a part in a manufacturing mold, the shape of the mold reflecting a modified part design that compensates for changes in the shape of the part that occur after the part is formed and removed from the mold, such that the formed part conforms to a target part design after it is removed from the mold and is in a relaxed position, wherein the part is a composite part constructed at least in part of reinforcing fiber and resin; and
    while the part is in the mold after being formed in the mold—
        finishing the part according to the modified part design, and
        inspecting the part using automated inspection equipment to confirm that the finished part conforms to the modified part design.

2. The method of claim 1, the step of finishing the part including—
    removing excess material from the part according to the modified part design, and
    creating apertures in the part according to the modified part design.

3. The method of claim 2, the step of finishing the part further including shaping one or more edges of the part with a router according to the modified part design.

4. The method of claim 2, the step of inspecting the part further comprising using automated inspection equipment to confirm that apertures, contours and a periphery of the part conform to the modified part design.

5. The method of claim 4, the step of inspecting the part further comprising using the automated inspection equipment to capture one or more images of the part in the mold and analyzing the one or more images to confirm that the apertures, contours and periphery of the part conform to the modified part design.

6. The method of claim 1, the step of forming the part in the manufacturing mold including combining the reinforcing fiber and the resin and placing the combined fiber and resin in the mold.

7. The method of claim 6, the step of forming the part including curing the resin after the reinforcing fiber and the resin are placed in the mold.

8. The method of claim 7, the step of curing the resin including heating the fiber and resin to a temperature of at least 200° C.

9. The method of claim 8, the step of curing the resin further including subjecting the fiber and resin mixture to a pressure of between 50 and 200 psi.

10. The method of claim 1, the modified part design compensating for changes in the shape of the part that result from part spring-in occurring when the part is cured during the step of forming the part in the manufacturing mold.

11. The method of claim 1, further comprising creating the modified part design using computer software to adjust a target part design.

12. The method of claim 11, further comprising using the computer software to perform finite element analysis.

13. The method of claim 1, further comprising creating the modified part design using a manual process of trial and error.

14. A method of manufacturing a composite part, the method comprising:
    creating a design for a composite part, the design including aperture definitions, surface contours and a periphery definition;
    modifying the part design to generate a modified part design that compensates for changes in the shape of the part that occur after the part is formed and removed from a manufacturing mold, such that the formed part conforms to a target part design after it is removed from the mold and is in a relaxed position;
    creating a manufacturing mold such that the shape of the mold reflects the modified part design;
    forming the composite part on the mold by placing a composite ingredient mixture in the mold, the composite ingredient mixture including carbon fibers and a resin;
    curing the part by heating the part to a temperature of at least 200° C. and allowing the part to cool to room temperature;
    while the composite part is in the mold after curing—
        removing excess material from the part according to the modified part design,
        shaping one or more edges of the part with a router according to the modified part design,
        creating apertures in the part according to the modified part design, and
        inspecting the part using automated inspection equipment to confirm that the apertures, surface contours, and a periphery of the part conform to the modified part design; and
    removing the composite part from the manufacturing tool.

15. The method of claim 14, the step of inspecting the part further comprising using the automated inspection equipment to capture one or more images of the part on the mold and analyzing the one or more images to confirm that the apertures, surface contours and periphery of the part conform to the modified part design.

16. The method of claim 14, further comprising modifying the part design using computer software to adjust a target part design using finite element analysis.

17. The method of claim 15, further comprising modifying the part design using a manual process of trial and error.

18. A method for forming parts comprising:
    forming a part in a manufacturing mold, the shape of the mold reflecting a modified part design that compensates for changes in the shape of the part that occur after the part is formed and removed from the mold, such that the formed part conforms to a target part design after it is removed from the mold and is in a relaxed position; and
    while the part is in the mold after being formed in the mold finishing the part according to the modified part design, including:
- removing excess material from the part according to the modified part design, and
- creating apertures in the part according to the modified part design, and inspecting the part using automated inspection equipment to confirm that the finished part conforms to the modified part design.

19. A method for forming parts comprising:

forming a part in a manufacturing mold, the shape of the mold reflecting a modified part design that compensates for changes in the shape of the part that occur after the part is formed and removed from the mold, such that the formed part conforms to a target part design after it is removed from the mold and is in a relaxed position; and while the part is in the mold after being formed in the mold—
- finishing the part according to the modified part design, and
- inspecting the part using automated inspection equipment to confirm that the finished part conforms to the modified part design, further comprising creating the modified part design using computer software to perform finite element analysis to adjust the target part design.

\* \* \* \* \*